United States Patent
Goodwin

[15] 3,650,094
[45] Mar. 21, 1972

[54] ACOUSTICAL FILTRATION SYSTEM

[72] Inventor: Raymond Wendell Goodwin, Westport, Conn.

[73] Assignee: United Aircraft Corporation, East Hartford, Conn.

[22] Filed: Dec. 19, 1969

[21] Appl. No.: 882,779

Related U.S. Application Data

[63] Continuation of Ser. No. 700,827, Jan. 26, 1968, abandoned.

[52] U.S. Cl. .............................55/277, 116/137 A, 210/19
[51] Int. Cl. .......................................................B01d 50/00
[58] Field of Search ................259/1; 55/227, 15; 210/19; 181/5; 116/137

[56] References Cited

UNITED STATES PATENTS

| | | | |
|---|---|---|---|
| 2,087,052 | 7/1937 | Steuart | 181/5 |
| 2,216,779 | 10/1940 | Houghton et al. | 55/277 |
| 2,414,495 | 1/1947 | Vang | 55/15 |
| 2,456,706 | 12/1948 | Horsley | 55/277 |
| 2,624,840 | 1/1953 | Hershberger | 310/8.8 |
| 2,766,881 | 10/1956 | Westervelt et al. | 210/19 |
| 2,913,602 | 11/1959 | Joy | 181/5 |
| 3,054,472 | 9/1962 | Atanasoff | 181/5 |
| 3,109,721 | 11/1963 | Zenner et al. | 55/15 |
| 3,255,571 | 6/1966 | Walker et al. | 55/174 |
| 3,371,233 | 2/1968 | Cook | 259/1 R |

*Primary Examiner*—Bernard Nozick
*Attorney*—Melvin Pearson Williams

[57] ABSTRACT

A fluid medium containing suspended particles is subjected to an asymmetrical sound wave having a high velocity in one direction of movement and a low velocity in the opposite direction of movement. The velocities are sufficiently great to produce square-law drag forces; and the suspended particles will be propelled through the fluid medium in a direction corresponding to the high velocity direction of the fluid medium.

23 Claims, 13 Drawing Figures

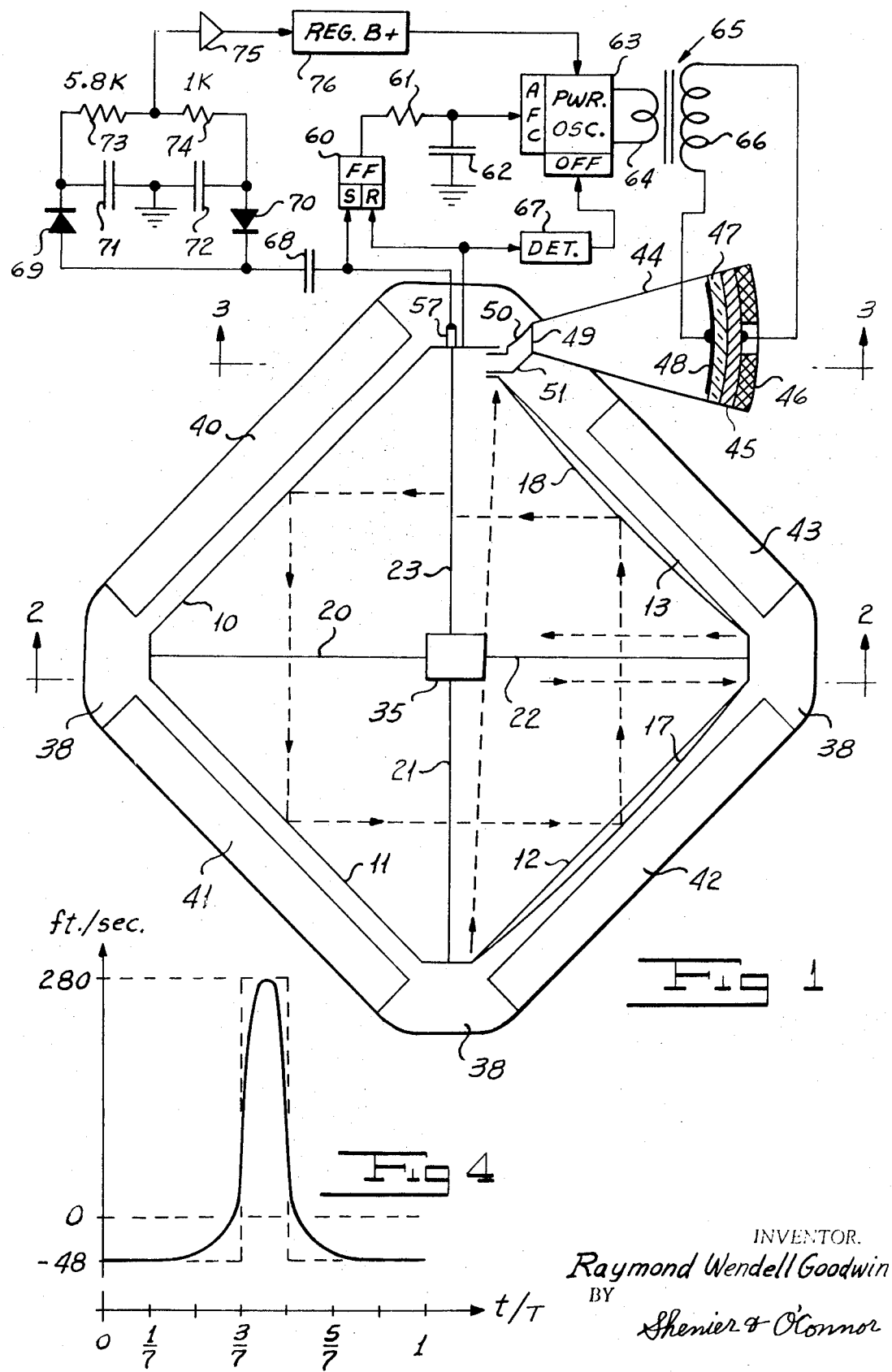

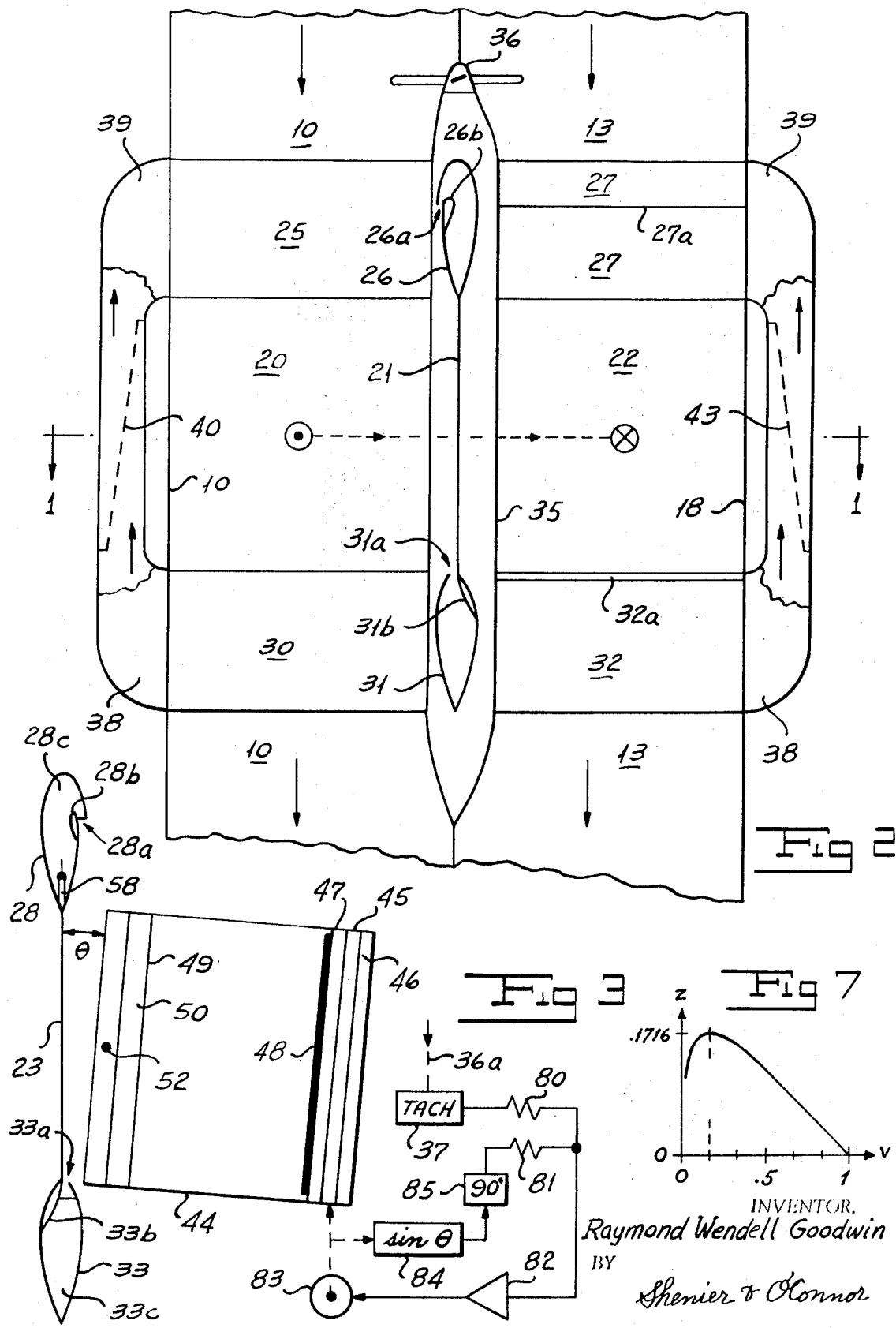

3,650,094

ACOUSTICAL FILTRATION SYSTEM

This application is a continuation of my copending application for Acoustical Filtration System, Ser. No. 700,827, filed Jan. 26, 1968, now abandoned.

SUMMARY OF THE INVENTION

One object of my invention is to provide an acoustical filtration system in which a fluid medium is subjected to a non-sinusoidal sound wave having a high velocity in one direction and a low velocity in the opposite direction.

Another object of my invention is to provide an acoustical filtration system having a high efficiency.

A further object of my invention is to provide an acoustical filtration system capable of separating extremely fine particles.

Other and further objects of my invention will appear from the following description.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a horizontal sectional view of my acoustical filtration system taken along the line 1—1 of FIG. 2.

FIG. 2 is a sectional elevation taken along the line 2—2 of FIG. 1.

FIG. 3 is a fragmentary sectional elevation taken along the line 3—3 of FIG. 1.

FIG. 4 is a graph showing the preferred non-sinusoidal sound wave.

FIG. 7 is a graph showing particle velocity as a function of the asymmetry of the sound wave.

DESCRIPTION OF THE PREFERRED EMBODIMENT

Figure 6A:
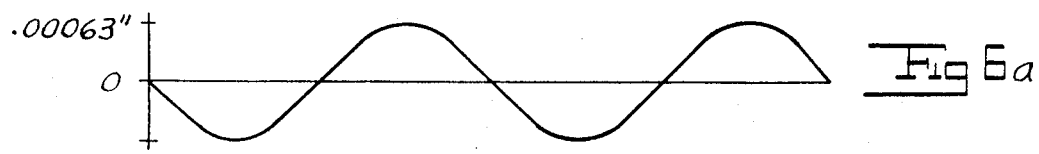
FIGS. 6a through 6g are graphs showing the operation of the sound generator.

Referring now more particularly to FIGS. 1 through 3 of the drawings, the fluid, which may be either gas or liquid, flows downwardly through a generally square duct having walls 10, 11, 12, and 13. Centrally disposed in the duct is a streamlined body 35 having a generally square cross section as may be seen by reference to FIG. 1. At the nose of body 35 is provided a flow measuring propeller. The upstream portion of body 35 is supported by four hollow struts 25, 26, 27, and 28 of airfoil shape. The downstream portion of body 35 is supported by four hollow airfoil struts 30, 31, 32, and 33. Four diaphragms 20, 21, 22, and 23 extend from the trailing edges of the upstream struts 25 through 28 to the leading edges of the downstream struts 30 through 33. Diaphragms 20 through 23 are further secured to the sides of body 35 and to the corners of the duct. Struts 25 through 28 are provided on one side, adjacent the minimum pressure point, with outlets (26a, 27a and 28a), each having an internal nozzle (26b and 28b). Struts 30 through 33 are provided on the corresponding side at the maximum pressure point with nose inlets (31a, 32a, and 33a), each having an internal diffuser (31b and 33b). The hollow struts 30 through 33 communicate with a peripheral collector 38 through apertures (33c); and the hollow struts 25 through 28 communicate with a peripheral distributor 39 through apertures (28c). Fluid from collector 38 flows to distributor 39 through a plurality of filters 40, 41, 42 and 43.

In the region between the upstream and downstream struts, sound is reflected from the duct walls and thus recirculated. Walls 12 and 13 are provided with respective concave and convex reflecting sections 17 and 18. The sound incident on section 17 is planar. Concave section 17 produces a converging reflected beam which is incident on section 18. Convex section 18 has a radius of curvature slightly less than that of section 17; and the beam reflected from section 18 is planar. It will be noted that the radial extent of diaphragm 22 is less than that of diaphragms 20, 21, and 23; and that the length of section 18 in FIG. 1 is less than that of section 17 or walls 10 and 11. Sound energy is introduced at the corner of the duct adjacent the shortened section 18.

I have shown a square duct having four reflecting walls since this provides the minimum surface area at the corners where the sound wave is propagated parallel to the corner surfaces.

However, it is sufficient that there be three reflecting surfaces. In such event, the duct would be of generally hexagonal cross section, because of the necessary enlargement of the corner surfaces to a somewhat greater size than the reflecting surfaces. This is not desirable because of the additional losses in the recirculating sound wave due to viscous effects along the corner surfaces. The central member 35 would, of course, be of triangular cross section.

The provision of five reflecting surfaces would result in a duct of pentagonal cross section. However, this would necessitate an undue increase in the size and surface area of what would now be a pentagonal central member 35. Again this increases acoustic losses due to viscous effects.

A wedge-shaped chamber 44 is hermetically sealed and filled with a gas having a high molecular weight and a low ratio of specific heats. Such gas is preferably dichlorotetrafluoroethane, commonly known as Freon F-114. Chamber 44 is provided with a curved end plate or mouth plate 45 of conductive material. Secured to the inside of end plate 45 is a dielectric layer 47 having a low bulk modulus of elasticity. Such dielectric layer is preferably vinylidene chloride, commonly known as Saran or Velon. Dielectric layer 47 is covered with an extremely thin layer of conductive material 48. Mouth plate 45 is covered on the outside with a layer of sound-absorbing material 46. Electrical contact is made with the conducting layer 48 and the end plate 45 of the electrostatic sound generator. Sound radiated from surface layer 48 converges by virtue of the curvature of end plate 45. Adjacent the throat of chamber 44 is positioned a sound permeable diaphragm 49 which seals chamber 44. The converging sound beam from the electrostatic generator passes through the diaphragm 49 and impinges on a convex reflecting surface 50. The radius of curvature of surface 50 is appreciably less than that of surface 48 and produces a planar reflected beam. The planar beam reflected from surface 50 is incident upon a plane reflecting surface 51. The beam reflected from surface 51 enters the duct at a corner adjacent section 18.

Transducers 57 and 58 are mounted in the trailing edge of strut 28 to provide outputs in accordance with motions of diaphragm 23. Transducer 57 is positioned at the outer extremity of strut 58 to respond to sound from surface 51 produced by the sound generator. Transducer 58 is positioned slightly inboard of transducer 57 to respond to recirculating sound reflected from section 18.

Chamber 44 extends the full axial length of diaphragm 23 between struts 28 and 33. Filters 40, 41, and 42 extend across the full width of respective walls 10 and 11 and section 17 to provide a large filtering area. Because of the provision of chamber 44, however, filter 43 extends along appreciably less than the full width of section 18.

The output of transducer 58 is coupled to the re-setting input of a flip-flop 60 and to the input of a detector 67. The output of transducer 57 is coupled to the setting input of flip-flop 60 and through a capacitor 68 to the anode of a rectifier 69 and the cathode of a rectifier 70. The cathode of rectifier 69 is coupled to ground through capacitor 71 and is coupled to the input of an inverting amplifier 75 through a 5.8 K resistor 73. The anode of rectifier 70 is coupled to ground through a capacitor 72 and is coupled through a 1K resistor 74 to the input of amplifier 75. The output of buffer amplifier 75 controls the direct-current output voltage of a regulated power supply 76 which excites a power oscillator 63. The output of flip-flop 60 is coupled through a low-pass filter comprising series resistor 61 and shunt capacitor 62 to the automatic frequency control input of oscillator 63. The output of detector 67 is coupled to an inhibiting input of oscillator 63 which turns off the oscillator when the output of transducer 58 exceeds a predetermined level. Oscillator 63 drives the primary winding 64 of a step-up transformer 65 having a secondary winding 66, one terminal of which is coupled to conductive layer 48 and the other terminal of which is coupled to end plate 45 of the electrostatic sound generator.

Chamber 44 is mounted on pivot 52 for rotation about an axis which is orthogonal to that of the duct and parallel to the plane of diaphragms 21 and 23. Thus the beam from the sound generator is introduced into the duct parallel to diaphragms 20 and 22 but with a component along the duct axis proportional to the sine of the angle of chamber rotation. The purpose of this rotation is to prevent recirculating sound energy from being carried downstream with the fluid. It is desired that the wound be projected with an upstream component which is precisely equal to the velocity of fluid flow, so that the recirculating sound energy remains in the region between the upstream and downstream struts.

Flow of fluid past propeller 36 causes it to rotate with a speed proportional to fluid velocity. The propeller shaft 36a drives an alternating current tachometer 37. A two-phase alternating current servomotor 83 controls rotation of chamber 44 and drives the rotor of a resolver 84. The fixed phase winding of servomotor 83, the exciting winding of tachometer 37, and the rotor winding of resolver 84 are all excited by an alternating current source (not shown), as will be appreciated by those having ordinary skill in the art. Resolver 84 need be provided only with the sine stator winding, since the cosine stator winding is not required. The output winding of tachometer 37 is coupled through a summing resistor 80 to the input of an alternating current amplifier 82. The sine stator winding of resolver 84 is coupled through a 90° phase-shifting circuit 85 and summing resistor 81 to the input of amplifier 82. The output of amplifier 82 controls the variable phase winding of servomotor 83.

In operation of my invention, fluid flows downwardly through the duct as indicated in FIG. 2. The sound introduced from chamber 44 through diaphragm 49 into the duct is successively reflected from walls 10 and 11 and then sections 17 and 18 back to wall 10 again, passing through the respective diaphragms 23, 20, 21, 22, and 23 again. The sound energy is thus conserved and only sufficient energy need be supplied at diaphragm 49 to make up for residual losses. It is assumed that the sound energy has a high velocity in the direction of propagation and a low velocity in the opposite direction. This corresponds to the circulation of positive instead of negative pressure pulses. When the fluid stream passes through the region between the upstream and downstream struts, suspended particles will be propelled counterclockwise in FIG. 1 to impinge upon the surfaces of the diaphragms. The fluid adjacent these surfaces of the diaphragms flows through the nose inlets (31a, 32a, and 33a) of the downstream struts and diffuses (31b and 33b) to higher pressure. The high pressure, low velocity fluid within the downstream struts then flows to collector 38 through the apertures (33( ) and thence through the filters 40 through 43 to distributor 39. Fluid from distributor 39 flows through the apertures (28c) into the upstream struts and thence through the nozzles (26b and 28b) and the outlets (26a, 27a, and 28a) into the main fluid stream within the duct adjacent the same sides of the diaphragms.

The fluid issuing from the upstream strut outlets (26a, 27a, and 28a) flows adjacent the diaphragms 20 through 23 so that any particles not removed by one passage through the filters 40 through 43 will be again subjected to the sound field and picked up by the nose inlets (31a, 32a, and 33a) of the downstream struts. Extremely small particles may require several passes through the filters before they are finally captured.

Flip-flop 60 adjusts the frequency of oscillator 63 so that the sound energy from chamber 44 is in phase with the recirculating sound energy in the duct. The sound energy consists essentially of widely spaced high pressure pulses of short duration as shown in FIG. 4. If the frequency of oscillator 63 is too low, the pulses received by transducer 57 will begin to lag slightly behind those received by transducer 58. Transducer 58 will re-set flip-flop 60 to provide a negative output. However, immediately thereafter transducer 57 will set flip-flop 60 to provide a positive output. The output of flip-flop 60 will then remain positive until the next pulse is sensed by transducer 58. Accordingly, the output of flip-flop 60 will be positive over most of the period between pulses and negative for only a short portion of the interval between pulses. This provides across capacitor 62 a net positive voltage which increases the frequency of oscillator 63. Conversely, if the frequency of oscillator 63 is too high, transducer 57 will receive pulses slightly prior to those received by transducer 58. This will provide a negative voltage across capacitor 62 which will decrease the frequency of oscillator 63.

It will be subsequently shown that the non-sinusoidal sound wave has greatest efficiency in particle filtration if the peak forward velocity is approximately 5.8 times the peak reverse velocity. The electrostatic sound generator provides a substantially sinusoidal velocity and pressure output adjacent surface 48. However, when the sound beam converges at diaphragm 49, the velocities in the Freon become appreciable compared with the speed of sound in Freon, and the magnitudes of the pressure crests or condensations appreciably exceed those of the pressure troughs or rarefactions. The effect is perhaps analogous to the cresting of ocean waves upon a gently sloping beach. Accordingly, the asymmetry of the pressure waveform appearing at diaphragm 49 is governed by the amplitude of the substantially sinusoidal sound wave produced at surface 48. If the amplitude of sound produced at surface 48 is very small, the ratio of the pressure condensation to the pressure rarefaction will be not appreciably greater than unity. However, as the amplitude of the sound generated at surface 48 is increased, the ratio of the pressure condensation to the pressure rarefaction at diaphragm 49 also increases. The positive outputs of transducer 57, corresponding to pressure condensations at diaphragm 49, are applied through rectifier 69 to capacitor 71; and the negative outputs of transducer 57, corresponding to pressure rarefactions at diaphragm 49, are coupled through rectifier 70 to capacitor 72. As previously indicated, it is desired that the pressure condensation be approximately 5.8 times the pressure rarefaction. If this relationship exists, the positive voltage across capacitor 71 will be 5.8 times the negative voltage existing across capacitor 72; and the voltage at the junction of the asymmetrical voltage-dividing resistors 73 and 74 will be at ground potential. If the sound intensity at diaphragm 49 is too low, the positive voltage across capacitor 71 will be less than 5.8 times the negative voltage across capacitor 72. The input to amplifier 75 will thus become negative. The negative input to inverting amplifier 75 results in a positive output, which increases the excitation voltage from power supply 76 to oscillator 63 and thus increases the intensity of sound at diaphragm 49. Conversely, if the intensity of sound at diaphragm 49 is excessive, the input of amplifier 75 will become positive. The resulting negative output from inverting amplifier 75 will decrease the excitation voltage from power supply 76 to oscillator 63, thereby reducing the sound intensity at diaphragm 49. Chamber 44 supplies more than sufficient energy to make up for the losses in the recirculating duct. Continued operation of the sound generator thus causes the intensity of sound within the duct gradually to increase. When the recirculating sound intensity reaches the desired level, detector 67 provides an output which disables oscillator 63. The sound intensity within the duct then gradually decays by a very small percentage, whereupon detector 67 no longer provides an inhibiting signal to oscillator 63. Oscillator 63 is again enabled and the recirculating sound energy is again built up to the desired level. The sound intensity within the duct will thus vary at a low rate slightly above and slightly below a nominally constant average value.

Tachometer 37 provides a positive polarity output proportional to fluid velocity within the duct and causes servomotor 83 to rotate chamber 44 to a position such as shown in FIG. 3 where the sound beam is provided with an upstream component. Resolver 84 provides a negative polarity output proportional to the sine of the tilt angle θ of chamber 44 from a neutral position where diaphragms 49 and 23 are parallel. The servosystem nulls when the opposite polarity outputs of tachometer 37 and resolver 84 are equal. The tilt angle will be small, since the velocity of fluid flow will be small compared with the speed of sound in the fluid. If the fluid is air having a speed of sound of 1,116 feet per second, and the flow velocity is 41 feet per second, the angle of tilt of chamber 44 will be θ = arc sin 41/1116 = 2.1°.

Figure 5:
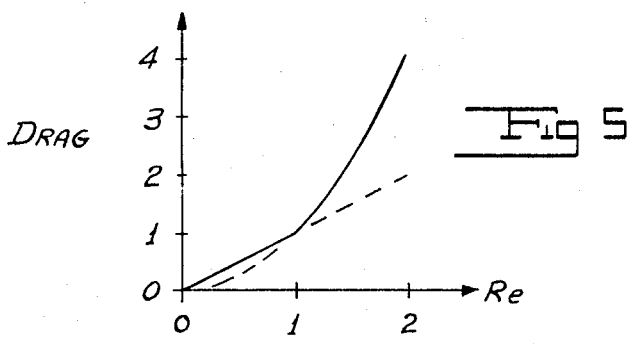
FIG. 5 is a graph showing the drag on a given suspended particle as a function of Reynolds number.

FIG. 5 shows that for Reynolds numbers greater than approximately unity, the drag force upon a sphere of given diameter varies substantially as the square of the Reynolds number and hence as the square of relative velocity.

If the frequency is sufficiently high, the mass of the particle sufficiently great, and the drag forces sufficiently small that the particle velocity z is substantially constant irrespective of alternating accelerations, then it may be shown that $$(V-z)^2 T = (v=z)^2 t \quad (1)$$

where $V$ is the high fluid velocity in one direction, where $T$ is the time during which fluid flows in that direction, where $v$ is the low fluid velocity in the opposite direction, and where $t$ is the time of fluid flow in such opposite direction. In a sound wave there is no net transport of fluid; and $$VT = vt \quad (2)$$

If $V = 1$ and $T = 1$, then $t = 1/v$. Making these substitutions into Equation (1) and solving for $z$, we obtain $$z = (\sqrt{V} - V)/(1 + \sqrt{V}) \quad (3)$$

Equations (1) and (3) express the fact that the particle velocity will stabilize at such value that the net positive and negative impulses exerted on the particle will be equal. Differentiating Equation (3) and setting the derivative equal to zero, we find $$(4) \quad \frac{dz}{dv} = \frac{1 - 2\sqrt{v} - v}{2\sqrt{v}(1 + 2\sqrt{v} + v)} = 0$$

Solving Equation (4), we find $$v = 3 - 2\sqrt{2} = (\sqrt{2} - 1)^2 = 0.1716 = 1/5.84 \quad (5)$$

Substituting this value into Equation (3), we obtain $$z = 3 - 2\sqrt{2} = v \quad (6)$$

Equation (5) expresses the fact that the optimum fluid velocity in the low velocity direction is equal to 1/5.84 of the fluid velocity in the high velocity direction; and Equation (6) points out that the particle velocity in the high velocity direction is equal to the fluid velocity in the low velocity direction.

FIG. 7 shows the particle velocity z as a function of the ratio $v$ of the low fluid velocity in one direction to the high fluid velocity in the opposite direction. When $v = 1$, the sound wave is symmetrical; and the particle velocity $z = 0$. As $v$ decreases below unity, $z$ initially increases linearly; and $z = (1-v)/4$. However, the function is concave from below and exhibits a maximum at $z = v = 0.1716$. For values of $v$ approaching zero, $z = \sqrt{v}$; and for $v = 0$, $z = 0$. From Equation (3) the particle velocity $z$ is 0.1544 or 90% of its maximum value at $v = 0.071$ and at $v = 0.335$. Thus the fluid velocity in the low velocity direction is not critical and may range between one-third and one-fourteenth of that in the high velocity direction with less than a 10% decrease from the maximum value of $z$.

FIG. 4 shows the velocity of diaphragm 49 as a function of time $t$, expressed in terms of the period T, which yields an approximation to a square-wave velocity waveform within the duct. The peak forward velocity is 280 ft./sec.; the peak reverse velocity is 48 ft./sec.; and the ratio of these velocities is 0.1716. It will be appreciated that a square waveform is not only difficult to obtain but also would produce sharp pressure fronts which would break down into shock, resulting in severe power losses. Because the velocity waveform is continuous and has a finite slope, there will be short periods of time when the velocity of the fluid molecules does not differ sufficiently from that of the suspended particles to produce Reynolds numbers greater than unity. During these short intervals, the drag forces are viscous and are first power functions of relative velocity. Thus the particle velocity $z$ will be slightly less than given by Equation (3).

It may be shown that the pressure ratio for sound waves in a gas is given by $$P/Po = [1/(1-v/Vs)]^k \quad (7)$$

where $Po$ is the ambient pressure, where $v$ is gas velocity, where $Vs$ is the speed of sound in the gas, and where $k$ is the ratio of specific heats. If the ratio $v/Vs$ is small compared to unity, then Equation (7) reduces to $$\Delta P = P - P0 = kPo(v/Vs) \quad (8)$$

For high amplitude sound waves in a gas, the high density condensations are of reduced length while the low density rarefactions are of greater length. The mark-space ratio of the resulting pressure pulses is governed by the ratio of densities. In the Freon, the molecular velocities are equal in both directions. The condensation density is $1/(1-v/Vs)$; and the rarefaction density is $1/(1+v/Vs)$. The mark-space ratio of pressure pulses in the Freon adjacent diaphragm 49 is thus $(1-v/Vs)/(1+v/Vs)$. However, the mark-space ratio of pressure pulses on diaphragm 49 depends on its velocities. If the diaphragm is stationary, then the pressure pulses on the diaphragm will have the same mark-space ratio is those in the Freon. If the diaphragm moves with a velocity which is always equal to that of the Freon molecules, then the mark-space ratio of pressure pulses on the diaphragm will be unity. It may be shown that the mark-space ratio of pressure pulses on the moving diaphragm is:

$$\frac{(1-v/Vs)(1+b/Vs)}{(1+v/Vs)(1-f/Vs)}$$

where $v$ is the alternating velocity of the Freon molecules, where $b$ is the backward velocity of the diaphragm, and where $f$ is the forward velocity of the diaphragm. The speed of sound in Freon is 409 ft./sec. Thus $b/Vs = 48/409 = 0.1175$ and $f/Vs = 280/409 = 0.685$. From the foregoing equation, we find that a value $v/Vs = 0.907$ yields the desired mark-space of 0.1716 for pressure pulses on diaphragm 49. The Freon velocity is thus $0.907(409) = 371$ ft./sec.

In the Freon adjacent diaphragm 49, the density in a condensation is increased by a factor of $1/(1-0.907) = 10.75$; and the density in a rarefaction is decreased by a factor of $1/(1+0.907) = 0.525$. The mark-space ratio of pressure pulses in the Freon adjacent diaphragm 49 is $0.525/10.75 = 0.0488$.

The ratio of specific heats for Freon is $k = 1.106$. It is preferable that this ratio be close to unity so that the speed of sound in the high temperature condensation will not appreciably exceed that in the low temperature rarefaction. Such temperature dependent variation increases the slope of the leading edge of the pulse and decreases the slope of the trailing edge of the pulse as the pressure crest tends to overrun the pressure trough and ultimately produce a shock at the leading edge. The temperature ratio between the crest and trough is $(1/0.0488)^{1.106-1} = (20.5)^{0.106} = 1.378$. Accordingly, the ratio of speeds of sound at the crest and trough is $\sqrt{1.378} = 1.17$. Thus the speed of sound in Freon in the crest is only 17% greater than that in the trough so that the sound wave will not readily break down into shock adjacent diaphragm 49.

The peak positive velocity of fluid molecules in the duct is 280 ft./sec. which is the same as that of diaphragm 49. If the fluid in the duct is air for which $Vs = 1,116$ ft./sec. and $k = 1.4$, then $v/Vs = 280/1,116 = 0.25$. The peak pressure ratio from Equation (7) is $P/Po = [1/(1-.25)]1.4-1.495$. Assuming that $Po$ for the air in the duct is 14.7 p.s.i., the positive pressure variation is $0.495(14.7) = 7.28$ p.s.i. The peak negative velocity of air molecules is 48 ft./sec.; and $v/Vs = 48/1,116 = 0.043$. The minimum pressure ratio from Equation (7) is $P/Po = [1/(1+0.043)]x$ 0.94. Accordingly, the negative pressure variation is $0.06(14.7) = 0.88$ p.s.i.

In the Freon adjacent the diaphragm, the peak pressure ratio is $P/Po = [1/(1-.907)]1.106-13.8$. The positive pressure variation is thus 12.8 $Po$. The minimum pressure ratio is $P/P_0 = [1/(1+0.907)] \times 0.49$. The negative pressure variation is thus 0.51 $P_o$. The total variation in the Freon from the maximum pressure to the minimum pressure is 13.31 $P_o$. In the duct, the total variation from the maximum pressure to the minimum pressure is 7.28+0.88 = 8.16 p.s.i. Accordingly, the pressure in the Freon should be $P_o = 8.16/13.31 = 0.614$ p.s.i.

Since the positive and negative pressure pulses in both the Freon and the air duct resemble half cycles of sinusoids of different amplitudes and periods, the RMS power densities in each half cycle are approximately equal to half of the peak instantaneous power densities. Accordingly, the mean power density transmitted by diaphragm 49 into the duct over a positive pressure pulse is (½)7.28(280)746/550 = 1,380 watts/in². The mean power density transmitted by diaphragm 49 into the duct over a negative pressure pulse is (½)0.88(48)746/550 = 29 watts/in². The average power density transmitted into the duct over a full cycle is [0.1716(1380)+29]/1.1716 = 226 watts/in².

The positive pressure variation in the Freon is 12.8(0.614) = 7.85 p.s.i. The negative pressure variation in the Freon is 0.51(0.614) = 0.31 p.s.i. The mean power density in the Freon over a positive pressure pulse is (½)7.85(371)746/550 = 1,970 watts/in². The mean power density in the Freon over a negative pressure pulse is (½)0.31(371)746/550 = 78 watts/in². The average power density in the Freon over a full cycle is (1,970+78)/2 = 1,024 watts/in². This is the same as the power which would be transmitted to diaphragm 49 if it were to oscillate with peak positive and negative velocities of 371 ft./sec., so that the pressure pulses on the diaphragm would have a mark-space ratio of unity. It will be seen that the efficiency of transfer of power from the Freon into the duct is 226/1,024 = 22.1%.

Assume that the diaphragms 20 through 23 are each 12 inches square and that the frequency of the sound pulses is 300 kilocycles. The wave length in air corresponding to this frequency is $1,116/3(10)^5 = 0.00372$ foot, which corresponds to 0.0446 inch. The total length traversed by the sound beam in one circuit of the duct is approximately 56 inches. This length represents 56/0.0446 = 1,250 cycles. Accordingly, the frequency of oscillator 63 need not be varied by more than 1/1,250 = 0.08% to maintain the pulses introduced from chamber 44 in synchronism with the recirculating pulses in the duct, despite large changes in the speed of sound in the air duct due to variations in ambient temperature.

The reflecting walls 10 and 11 and the reflecting sections 17 and 18 may be formed of aluminum or steel for which the velocity of sound is approximately 16,700 ft./sec. The critical angle between air and these metals for sound reflection is arc sin 1,116/16,700 = 3.8°. For the reflecting sections in the duct, the angle of incidence is substantially 45°, which greatly exceeds this critical angle; and hence there is total internal reflection of sound with no sound refracted into the metal reflectors. Accordingly, no power loss occurs due to reflection. Negligible acoustic loss occurs due to the action of fluid viscosity at wall surfaces, since the lengths of these surfaces are very short, comprising the surfaces of the center body member 35 and the corresponding short surfaces of the duct adjacent the corners.

The surface area of diaphragms 20 through 23 is 144 square inches; and the total recirculating power is 144(226) = 32.6 kilowatts. If the Q of the duct is 250, then only 0.4% of the total recirculating power in the duct is lost. The sound generator accordingly must supply an average power of 130 watts. In order to insure that the power density in the duct will build up to the desired level, the sound generator may supply 0.5% of the total recirculating power, or 163 watts. Thus oscillator 63 will have a duty cycle of 80%, since it is disabled 20% of the time. The desired power density in the duct can be maintained even if its Q drops to 200 due to an abnormally high concentration of suspended particles, since oscillator 63 will be continuously enabled.

In FIG. 1, the curvatures of sections 17 and 18 and the radial length of diaphragm 49 have been shown greatly exaggerated corresponding to a much lower Q of the duct. In practice, for a radial length of diaphragm 23 of 12 inches, the radial length of diaphragm 49 will be only 12(0.005) = 0.06 inch.

Since the efficiency of sound conversion from Freon to air is 22.1%, the required power at surface 48 is 163/0.221 = 735 watts. The power loss in the sound generator due to reflections at diaphragm 49 is 735−163 = 572 watts. Preferably the interior surfaces of the converging side walls of chamber 44 are lined with a sound absorbing material, such as cloth formed of glass fibers. If the sound generator has a length of 12 inches corresponding to the axial length of the diaphragms and an arc length of 5.3 inches, the surface area is 64 square inches. The power density at surface 48 is 735/64 = 11.5 watts per square inch. Employing the approximation of Equation (8), it can be shown that the RMS sound intensity, I, in watts per square inch is substantially $$I = \tfrac{1}{2}kP_o(v_2/V_s)746/550 \quad (9)$$

The peak sinusoidal velocity of surface 48 as implicitly determined from Equation (9) is $v = 101$ ft./sec. From approximate Equation (8) the peak positive and negative pressure variations are 1.106(0.614)101/409 = 0.168 p.s.i. However, $v/V_s = 101/409 = .247$ and from Equation (7) the peak pressure is $.614[1/(1−.247)]1.106 = .840$ p.s.i. and the minimum pressure is $0.614[1/(+0.247)]^{1.106} = 0.481$ p.s.i. The mean pressure variation is actually (0.840−0.481)/2 = 0.180 p.s.i. Accordingly, the velocity of surface 48 should be reduced approximately to $101\sqrt{0.168/0.180} = 98$ ft./sec. to obtain the desired power density. From Equation (7) the peak pressure is now 0.833 p.s.i. and the minimum pressure is now 0.483 p.s.i. The positive pressure variation is 0.833−0.614 = 0.219 p.s.i.; the negative pressure variation is 0.614−0.483 = 0.131 p.s.i.; and the mean pressure variation is (0.219+0.131)/2 = 0.175 p.s.i. The peak displacement of surface 48 is $98/2\pi 3(10)^5 = 5.2(10)Y^{-5}$ foot which corresponds to 0.00063 inch.

Dielectric layer 47 may comprise polyethylene or Saran. The speed of sound in Saran is 940 ft./sec.; and the wave length is $940/3(10)^5 = 0.00313$ foot which corresponds to 0.0376 inch. In order to obtain quarter wave length resonance at 300 kc. in Saran, its thickness should be 0.0376/4 = 0.0094 inch. However, the conducting layer 48, which may comprise a 1 mil thickness of aluminum bonded to the Saran layer 47, introduces some top loading of the resonator. The specific gravity of Saran is 1.7 and the specific gravity of aluminum is 2.7. The 1 mil thickness of the aluminum layer 48 thus corresponds to a Saran thickness of approximately 0.001(2.7)/1.7 = 0.0016 inch. Accordingly, the actual thickness of the Saran layer 47 should be 9.4−1.6 = 7.8 mils. The displacement of surface 48 thus produces a small variation of 0.63/7.8 = 8.0% in the thickness of the Saran layer.

The bulk modulus of both Saran and polyethylene is 20,000 p.s.i. Neglecting the top loading and assuming a Saran thickness of 0.0094 inch, the maximum sound pressure within the Saran would be 20,000(98)/940 = 2,080 p.s.i. Because of the top loading of aluminum, the equivalent length is shortened to 0.0078(90)/0.0094 = 74.7°. Accordingly, the maximum sound pressure in the Saran is 2,080/sin 74.7° = 2,160 p.s.i.

The backing plate 45 to which the Saran layer 47 is bonded is preferably steel but may comprise aluminum. The electrical resistance of steel is less than four times that of aluminum; and both materials are good conductors. The speed of sound in aluminum or steel is approximately 16,700 ft./sec., and the wave length is $16,700/3(10)^5 = 0.0556$ foot which corresponds to 0.668 inch. A quarter wave length resonator backing plate is desired; and its thickness should be 0.668/4 = 0.167 inch. The maximum sound pressure in the backing plate is the same as that in the Saran to which it is bonded. For a steel backing plate the bulk modulus of elasticity is $30(10)^6$ p.s.i. Accordingly, the peak velocity at the free surface of the backing plate is $2,160(16,700)/30(10)^6 = 1.2$ ft./sec. Employing Equation (9), the density of power radiated into the air from the free end of the backing plate is 0.018 watt/in². Since the area of the backing plate is 64 square inches, the total power loss will be 0.018(64) = 1.15 watts. If the backing plate is formed of aluminum having a bulk modulus of elasticity of $10(10)^6$ p.s.i., the velocity of the free surface of the backing plate will be increased by a factor of three to 3.6 ft./sec. The power density in air at the rear surface of the backing plate will be increased by a factor of nine to 0.16 watt/in.$^2$; and the total power radiated from the free surface of the backing plate will be likewise increased by a factor of nine to 10.4 watts. It will be appreciated that even this power loss is negligible. The sound absorbing layer 46 may comprise roving or cloth formed of glass fibers.

For a capacitor, the pressure between the plates in pounds per square inch may be determined from the following equation:

$$P = 0.99(10)^{-12}(KE/L)^2 \qquad (10)$$

where $K$ is the dielectric constant of the insulating material and $L$ is the spacing between the plates.

Figure 6B:
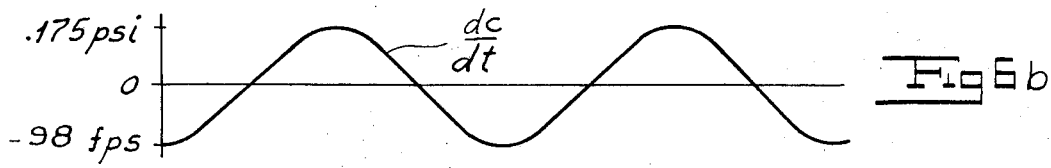
Figure 6C:
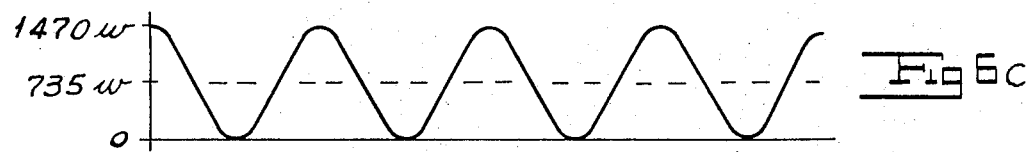

FIG. 6a shows the sinusoidal displacement of the capacitor plate 48 at a frequency of 300 kc. FIG. 6b shows both the velocity of surface 48 and the corresponding approximate sound pressure in the Freon. Since the amplitude of motion of surface 48 is a relatively small portion of the thickness of the dielectric layer 47, the velocity of surface 48 is substantially proportional to the rate of change of capacitance $dc/dt$. FIG. 6c shows the instantaneous sound power radiated into the Freon. This instantaneous power varies at a 600 kc. rate between 1,470 watts and zero watts to yield an average power of 735 watts.

Figure 6D:
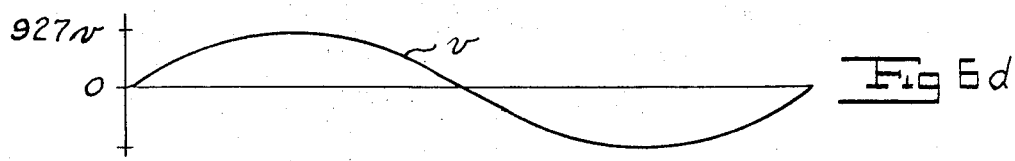

FIG. 6d shows that the voltage impressed between the surface layer 48 and backing plate 45 varies at a 150 kc. rate which is only one-half the frequency of oscillation of surface 48. The reason for this is that dielectric attraction between capacitor plates occurs irrespective of the polarity of the applied voltage. From Equation (10) it will be noted that the dielectric pressure is proportional to the square of the voltage.

Figure 6E:
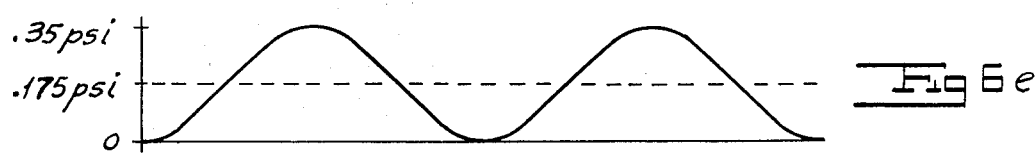

FIG. 6e shows the dielectric pressure between the capacitor plates occasioned by the application of the voltage of FIG. 6d. The mean variational sound pressure in the Freon at surface 48 is 0.175 p.s.i. The instantaneous dielectric pressure between the plates varies between 0.35 p.s.i. and zero p.s.i. at a 300 kc. rate, producing an average pressure of 0.175 p.s.i. in the Saran layer 47. This average pressure introduces negligible steady state compression of the Saran.

The dielectric constant of Saran is $K = 5$. Substituting the peak pressure of 0.35 p.s.i. into Equation (10), we find $E/L =$ 119 volts per mil. The dielectric strength of Saran is 500 volts per mil even at 1 mc., so that the dielectric stress is well within the limits of this material. Since the thickness of the Saran is 7.8 mils, the required peak voltage from secondary winding 66 is 119(7.8) = 927 volts.

For a capacitor, it is well known that $$q = cv \qquad (11)$$

Differentiating Equation (11) with respect to time, we find $$dq/dt = i = c\,dv/dt + v\,dc/dt \qquad (12)$$

The second term of Equation (12) represents the power current flow through a varying capacitance. The first term of Equation (12) represents the reactive current flow. Since the capacitance variation is a small portion of the average capacitance, the reactive current is substantially sinusoidal with only 8% third harmonic.

Figure 6F:
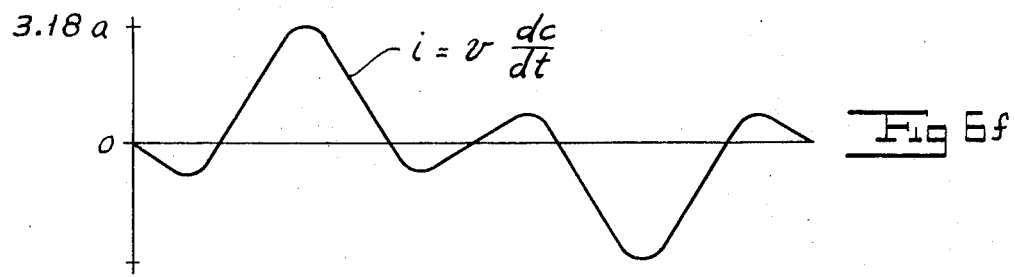
Figure 6G:
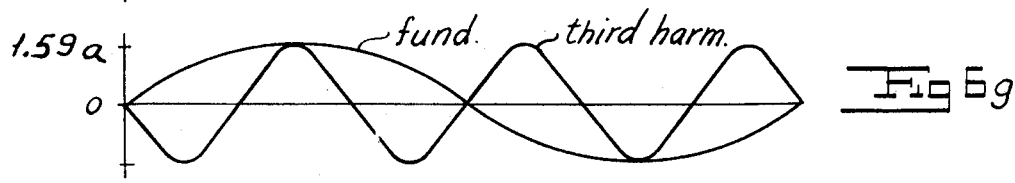

FIG. 6f shows the power current flow through the varying capacitance between surface 48 and backing plate 45. FIG. 6g shows that the power current waveform of FIG. 6f contains a fundamental 150 kc. component and a third harmonic component, each having a peak amplitude of 1.59 amperes. As will be seen from FIG. 6f, the peak instantaneous power current is 3.18 amperes. The RMS electrical power at the fundamental frequency of 150 kc. is $vi/2 = 927(1.59)/2 = 735$ watts.

It may be shown that the capacitance between two plates is $$c = 2.24(10)^{-13}KA/L \text{ farads} \qquad (13)$$

Substituting the dielectric constant for Saran $K = 5$, the area of 64 square inches, and the thickness of 0.0078 inch into Equation (13), we find $c = 9.2(10)^{-9}$ farad. The inductance of secondary winding 66 should be such as to resonate with this average capacitance between surface 48 and backing plate 45 at a frequency of 150 kc.

The excitation current corresponding to the first term of Equation (12) is $i = 9.2(10(^{-9}2\pi(1.5)10^5(927) = 8.04$ amperes peak current. As previously indicated, this reactive current is of substantially sinusoidal waveform. The power factor of Saran is 0.03. Accordingly, the dielectric loss is 0.03(8.04) 927/2 = 112 watts. This means that approximately 735+112+ = 848 watts must be supplied by oscillator 63 in order to produce 735 watts radiated from surface 48 into the Freon and 163 watts radiated from diaphragm 49 into the duct.

If the fluid is a liquid such as water, then diaphragms 20 through 23 and 49 may be fractional wave length thicknesses of aluminum. However, the density of aluminum is 2.7 times that of water and its velocity of sound is much greater, so that appreciable losses due to reflections will occur even if the aluminum diaphragms are made extremely thin. Furthermore, such thin diaphragms would be subject to damage. Preferably, if the fluid is a liquid such as water, the diaphragms should comprise materials for which the product of bulk modulus and density is substantially the same as that for water. The bulk modulus of water is $3.1(10)^5$ p.s.i. Such materials for the diaphragms would comprise cellulose acetate butyrate having a specific gravity of 1.1, ethyl cellulose having a specific gravity of 1.05, polystyrene having a specific gravity of 1.054, and polymide (commonly known as nylon) having a specific gravity of 1.09. Each of these plastics has a bulk modulus of elasticity which may be anywhere in the range of $2.6(10)^5$ p.s.i. and $3.5(10)^5$ p.s.i., so that the acoustical impedance may be made equal to that of water. Such plastic diaphragms offer in effect a continuum to the passage of sound waves while providing a mechanical barrier for the particles to be filtered.

However, if the fluid in the duct is a gas such as air, then the only "diaphragm" sufficiently thin to prevent severe reflections would be a glycerine or soap bubble film, the strength of which is determined merely by surface tension. Such surface tension films are extremely difficult to maintain over large areas and would be readily punctured or broken by turbulence in the gas flow, if not by impingement of the particles to be filtered. Furthermore, diaphragm 49 must resist a pressure difference of 14.7−0.6 = 14.1 p.s.i.

However, sound can still be propagated with negligible loss if the diaphragms are in actuality delay lines of an integral multiple of one-half wave length. For such delay lines, there is no requirement of an impedance match. A positive pressure pulse in the duct gas impinging on one surface of the delay line is transmitted forwardly through the delay line as a positive pressure pulse. It is then reflected from the other surface of the delay line as a negative pressure pulse which travels backwardly through the delay line to the first surface, where it is reflected as a positive pressure pulse which again travels forwardly through the delay line. If the backwardly traveling negative pressure pulse in the delay line arrives at the first surface concomitantly with the arrival of the next positive pressure pulse in the duct gas, all of the sound energy in the gas will be absorbed on the first surface of the delay line without reflection. The energy absorbed on the first surface is then transmitted to the duct gas from the second surface with negligible attenuation. Such delay line diaphragm does not truly constitute a "resonator" since the pulses are not sinusoidal; and standing waves do not exist. Many sound pulses are, of course, required before the pulse amplitude in the delay line diaphragm builds up to equality with that in the duct gas.

Materials suitable for the delay line diaphragms are polyethylene or preferably vinylidene chloride, commonly known as Saran. The speed of sound in Saran is 940 ft./sec. and the wave length for a frequency of 300 kc. is 0.0376 inch. Thus a one-half wave length thickness corresponds to 0.0188 inch. The Saran diaphragms may be placed in tension between the trailing edges of the upstream struts and the leading edges of the downstream struts and between the corners of the duct and the central body member 35. This tension along either or both axes in the plane of a diaphragm serves to give it increased rigidity and prevent gross vibrations in the air flow. The thickness of diaphragm 49 may be doubled to equal a full wave length or 0.0376 inch to reduce the bending stresses which arise because of the pressure difference between the air in the duct and the Freon in chamber 44. As will be appreciated by those having ordinary skill in the art, a diaphragm may have a thickness of any integral number of half wave lengths and still function properly as a delay line.

As previously indicated and as shown in FIG. 5, the drag force upon a sphere of given diameter D changes from a first power to a second power function of velocity at Reynolds numbers greater than unity. This relation is not strictly correct. The viscous or first power law of Stokes holds for Reynolds numbers less than about 1/5 to ½, which are small compared with unity. Appreciable separation of the wake for spheres occurs at a Reynolds number of 2; and a fully separated wake occurs at a Reynolds number of 10. Thus in actuality the drag force gradually changes from a first power law to nearly a square law over Reynolds numbers from 1/5 to 10. In order to simplify the computations, however, we shall assume that the drag law suddenly changes at a "critical" Reynolds number of approximately unity. It is well known that the Reynolds number $Re$ is determined by $$Re = vD/u \quad (14)$$

where $u$ is the kinematic viscosity, which is equal to the ratio of dynamic viscosity to density. The standard value of kinematic viscosity for dry air is $u = 0.00189$ inch-ft./sec. Substituting the assumed critical Reynolds number $Re = 1$ and the kinematic viscosity of air into Equation (14), we find that $$vD = 0.00189 \text{ inch-ft./sec.} \quad (15)$$

represents the critical product of particle diameter and relative velocity. It will be recalled that the peak negative velocity of air molecules in the duct is 48 ft./sec. and that the suspended particles move with a positive velocity which is precisely equal to the negative velocity of the air molecules. Accordingly, the minimum relative velocity between the suspended particles and the air molecules subjected to the sound wave is 96 ft./sec. Substituting this value into Equation (15), we find that the minimum diameter of suspended particles for perfect operation is $D = 2.0(10)^{-5}$ inch. If the suspended particles are smaller than this value, then their average velocity of movement in the high velocity direction of the sound wave will drop below 48 ft./sec. If the particles are so small that their average velocity approaches zero, then the relative velocity between these particles and the air molecules during the peak positive velocity of air molecules in the duct will be simply 280 ft./sec. Substituting this value into Equation (15), we find that the maximum diameter of suspended particles to escape filtering effects is $D = 0.68(10)^{-5}$ inch.

Summarizing the foregoing, particles of diameters exceeding $2(10)^{-5}$ inches will be driven through the fluid in the high velocity direction of the sound wave with a speed of 48 ft./sec. Particles of diameters less than $2(10)^{-5}$ inch but greater than $0.68(10)5$ inch will be driven through the fluid, but at correspondingly reduced velocities. Suspended particles of diameters less than $0.68(10)^{-5}$ inch will not be subjected to any net motion and will thus escape filtration.

If the suspended particles are solids, they will not ordinarily be smooth spheres but will most likely be of irregular surface and have thickness ratios appreciably different from unity. In the air flow caused by the sound pulses, these particles will be subjected to moments which will rotate them to positions where their long axes are orthogonal to the flow and their short axes are parallel to the flow. This renders the suspended particles fairly bluff bodies so that the critical Reynolds number at which their drag changes from a linear to a square-law function is reduced. Accordingly, solid particles will be subjected to appreciably greater filtering effect than simple smooth-surfaced spheres.

If the suspended particles are liquids, then surface tension will cause them to assume a spherical shape. For such liquids as alcohol, benzene, carbon tetrachloride, kerosene, and oil, the surface tension is approximately 0.0002 pound per inch. The pressure within these liquid spheres due to surface tension is $2T/R$ so that if the particle has a diameter of $2(10)^{-5}$ inch, the internal pressure is $2(0.0002)/10^{-5} = 40$ p.s.i. In the air flow due to the sound pulses, these liquid particles are subjected to an increased pressure at the nose and to a decreased pressure around the maximum diameter orthogonal to the flow. For an air velocity of 280 ft./sec., the dynamic pressure at the nose, where air is brought to rest, is $q = +0.64$ p.s.i. Around the maximum diameter, the air velocity is 50% greater than the free stream value; and the pressure is $-1.25q = -0.80$ p.s.i. The total pressure difference between the nose and the maximum diameter is 1.44 p.s.i. This distorts the sphere into an ellipsoid of revolution, the minor axis of which is parallel to the air flow. As the liquid sphere distorts into an ellipsoid, the air velocity at the maximum diameter further increases which in turn lowers the pressure, thus causing further distortion from a spherical shape. Such distortion is opposed by the effects of surface tension. As with solid particles, the distortion of the liquid spheres into ellipsoids lowers the critical Reynolds number at which the drag changes from a linear to a square-law function. Accordingly, liquid particles will be subjected to somewhat greater filtering effect because of this distortion to ellipsoidal form in the air flow.

Thus far we have entirely ignored the well-known agglomerating effect of the ultrasonic sound wave upon suspended particles, both solid and liquid, of extremely small size. It will be appreciated that when these extremely small particles coalesce to diameters exceeding $0.68(10)^{-5}$ inch, they will be driven through the fluid and hence be subject to capture. Thus substantially all suspended particles may be captured, irrespective of the minuteness of their original diameters.

The maximum distance traversed by a suspended particle in the duct before it impinges upon one of the diaphragms may be determined from FIG. 1. Such particles enter at the corners of the duct adjacent the back surfaces of the diaphragms. For example, a particle initially passing on the left side of diaphragm 23 at the uppermost corner of the duct first moves 1 inch to the left solely under the influence of the sound wave transmitted through diaphragm 23. Thereupon such particle is subjected both to the sound wave transmitted through diaphragm 23 and to the sound wave reflected from wall 10. The particle moves downwardly and to the left parallel to the wall surface 10 until it escapes the influence of the sound wave transmitted through diaphragm 23. Thereupon the particle moves downwardly through a distance of 1 inch until it impinges upon diaphragm 20 under the influence of the sound wave reflected from wall 10. Of course, during this period, the particle is moving through the duct with a velocity substantially equal to the air flow.

The sound wave transmitted through diaphragm 23 and incident on wall section 10 may be considered independent of the sound wave reflected from wall 10. Thus a particle initially passing on the left side of diaphragm 23 at the uppermost corner of the duct moves 1 inch to the left under the influence of the sound wave transmitted through diaphragm 23 and then 13 inches downwardly under the influence of the reflected sound wave from wall 10 until it impinges upon diaphragm 20. The particle moves through an effective distance of 14 inches. Since the particles have a velocity of 48 ft./sec. and the axial length of the recirculating sound sections is 12 inches, the gas flow through the duct should be limited to a velocity of 48(12)/14=41 ft./sec. in order to capture all particles exceeding $2(10)^5$ inch diameter. As previously indicated, this velocity of gas flow requires a tilt of 2.1° for chamber 44.

The entrances from and the exits to the filters may be provided with flapper valves, not shown, to selectively prevent any fluid flow therethrough. Thus from one to three filters may be removed at one time for cleaning. The operation of the system need not be interrupted, since the remaining filter or filters are still effective to collect the agglomerated particles.

If the particles are liquid spheroids having a specific gravity of substantially unity, then they will have a mass of $M = \pi D^3/3$ slug and a frontal area of $\pi D^2/4$. The density of air is 0.00237 slug/ft.$^3$; and assuming a drag coefficient for oblate spheroids of unity, the force will be $F = (0.00237)V^2\pi D^2/8$. The acceleration will thus be $a = (0.00237)3V^2/8D = 0.00089V^2/D$. For a particle diameter of $2(10)^{-5}$ inch which corresponds to $1.67(10)6$ foot and a relative air velocity of $280-48 = 232$ ft./sec., the acceleration will be $a = 28.5(10)^6$ ft./sec$^2$. Since the particles are moving at a nearly constant speed in the direction of the wave, the relative frequency of the sound wave is reduced to $300(1-48/1,116) = 287$ kc. For a relative frequency of 287 kc., the period is $3.5(10)^{-6}$ sec; and the duration of each positive pressure pulse is $(0.1716)3.5(10)^{-6}/1.1716 = 0.512(10)6$ sec. The change in velocity of the suspended particle caused by the positive pressure pulse is thus $28.5(10)^6 \, 0.512(10)^{-6} = 14.6$ ft./sec. This corresponds to a velocity variation of ±7.3 ft./sec. from the average particle velocity of 48 ft./sec. Accordingly the particle velocity is substantially constant since it exhibits a variation of only $7.3/48 = 15.2\%$ from its average velocity. It will be seen then that the initial assumption in deriving Equation (1) is justified.

During a condensation, the air density in the duct is increased by a factor of $1/(1-280/1,116) = 1.333$; and during a rarefaction the density is decreased by a factor of $1/(1-48/1,116) = 0.957$. The mark-space ratio of the pressure pulses in the duct and of the alternate impulses on a suspended particle moving with a constant velocity is decreased to $0.1716(0.957]1.333 = 0.123$. However, Equation (1) is still correct, since the net positive and negative impulses on a suspended particle are not changed. During a positive pressure pulse, the drag force is greater due to the increased density, but the time is correspondingly less because of the reduced mark-space ratio. The increased density during a pressure pulse, however, does reduce the kinematic viscosity which in turn increases the Reynolds number. This reduces the minimum diameter of captured particles to $0.68(10)^{-5}/1.333 = 0.51(10)^{-5}$ inch.

Thus far we have assumed that the sound energy has a high velocity in the direction of propagation and a low velocity in the opposite direction. This mode of operation is preferable for high power densities whether the fluid is liquid or gas, since such media can sustain many atmospheres of positive sound pressure. But negative sound pressures in gases are effectively limited to approximately half an atmosphere; and negative sound pressures in liquids (unless carefully degassed) are limited to slightly less than one atmosphere because of vaporization of the liquid which results in cavitation.

If the suspended particles are of appreciable size so that they can be driven by asymmetrical sound waves of low power densities, then negative pressure pulses may be employed so that the fluid has a low velocity in the direction of propagation and a high velocity in the opposite direction. For example, when particles of talcum powder are permitted to drop under the influence of gravity past a conventional moving-coil electrodynamic loudspeaker radiating in a horizontal plane and excited by a sinusoidal audio oscillator or by a free-running audio multivibrator of unity mark-space ratio, the particles are not deflected by the sound wave and fall in the same position as if the loudspeaker were not excited. However, when the loudspeaker is driven by a multivibrator of other than unity mark-space ratio, then for one polarity of excitation the particles are deflected toward the loudspeaker while for the opposite polarity of excitation the particles are deflected away from the loudspeaker. As will be seen from FIG. 7, for mark-space ratios greater than one-third, the deflection is nearly proportional to the deviation in mark-space ratio from unity.

It will be seen that the objects of my invention have been accomplished. My acoustical filtration system has a high efficiency and is capable of separating extremely fine suspended particles.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described invention, what is claimed is: 1—)]

1. An acoustical filtration system comprising:
   a duct, adapted to receive a flow of a fluid containing suspended particles which are to be filtered from the fluid by said system, said duct comprising at least three substantially planar sound reflecting walls relatively disposed with respect to one another so that sound reflected from one wall to the adjacent wall will in turn be reflected to a subsequent wall thereby recirculating in a first plane substantially perpendicular to the fluid flow path through said duct;
   sound generating means for producing an oscillatory sonic signal characterized by a relatively high velocity in a first direction for a short portion of the period of said sonic wave and a relatively low velocity in an opposite direction for a relatively long portion of the period of said sonic wave in a predetermined mark-space ratio, said sound generating means disposed with respect to a wall of said duct so as to introduce into a fluid flowing within said duct a sound wave propagating in said first plane;
   a sound permeable, particle impermeable diaphragm disposed at a point in said duct so as to intersect said first plane, said diaphragm disposed in a second plane substantially parallel with the fluid flow passage through said duct and substantially perpendicular to said propagating sound waves; and
   inlet means disposed in proximity with a downstream portion of said diaphragm for withdrawing matter flowing along said diaphragm in said duct, said circulating sound waves producing at least a component of velocity in particles flowing within said duct which is transverse to said diaphragm and to the fluid flow path in said duct, whereby particles suspended in fluid flowing in said duct impinge on said diaphragm and are carried downstream along said diaphragm to said inlet means.

2. A system as in claim 1 wherein said sound generating means produces pressure pulses of mark-space ratio less than one-third but greater than one-fourteenth.

3. A system as in claim 1 wherein the fluid flows along a path with a certain velocity and wherein the asymmetrical sound wave has a certain velocity of propagation through the fluid, and wherein said sound generating means is oriented with respect to said duct such that the sound wave is propagated through the fluid in a direction providing a propagation velocity component which is equal in magnitude but opposite in polarity to the fluid flow velocity.

4. A system as in claim 1 wherein the duct comprises four sound reflecting walls, a first wall being concave from within, a second wall being convex from within, the third and fourth walls being planar, said sound generating means and said first and second walls being oriented such that the sound wave reflected from said concave wall is incident upon said convex wall.

5. A system as in claim 4 wherein said sound generating means is positioned to couple the asymmetrical sound wave to the fluid within the duct adjacent said convex wall.

6. A system as in claim 1 which further includes means for providing a signal in accord with the velocity of fluid flow through said duct and means responsive to said signal for rotating said sound generating means about an axis orthogonal to that of the duct through an angle which is substantially equal to arc sin $v/V_s$, where $v$ is the velocity of fluid flow and $V_s$ is the speed of sound in the fluid, and in a direction to produce an upstream component of propagation of the sound wave.

7. A system as in claim 1 in which the acoustical power coupled into the duct exceeds the acoustical power losses in the duct, the system further including means for providing a signal in accord with the amplitude of recirculated sound pulses and means responsive to said signal for periodically enabling and disabling said sound generating means.

8. A system as in claim 1 which further includes means for providing a signal in accord with deviations from said predetermined mark-space ratio and means responsive to said signal for controlling the acoustical power output of said sound generating means.

9. A system as in claim 1 which further includes first transducing means responsive to recirculated sound pulses, second transducing means responsive to sound pulses provided by said sound generating means, means responsive to the first and second transducers for detecting deviations in synchronism between the pulses generated and the pulses recirculated, and means responsive to the detecting means for controlling the frequency of the generating means.

10. A system as in claim 1 which further includes means for filtering the fluid withdrawn by said inlet means, and outlet means for introducing the filtered fluid into the duct upstream of said reflecting walls.

11. A system as in claim 10 in which the filtering means comprises a plurality of filters connected in parallel.

12. A system as in claim 10 wherein said inlet means comprises a pitot inlet slit positioned adjacent the downstream portion of said diaphragm, and said outlet means comprises a venturi outlet slit positioned adjacent the upstream portion of said diaphragm.

13. An asymmetrical sound wave generator including in combination a wedge-shaped chamber having a throat diaphragm and a conductive mouth plate which is concave from within, a dielectric layer of uniform thickness secured to the interior surface of the mouth plate, a thin layer of conductive material covering the dielectric layer, the chamber containing a gas, and means for applying an alternating voltage of a certain frequency between the mouth plate and the layer of conductive material.

14. A generator as in claim 13 wherein the dielectric layer has a thickness which is somewhat less than that providing one-quarter wave length resonance at twice said frequency.

15. A generator as in claim 13 wherein the dielectric layer has a small bulk modulus of elasticity which is of the order of magnitude of 20,000 p.s.i.

16. A generator as in claim 13 wherein the mouth plate has a thickness providing one-quarter wave length resonance at twice said frequency.

17. A generator as in claim 13 wherein the gas has a high molecular weight and a low ratio of specific heats.

18. A generator as in claim 13 wherein the gas is dichlorotetrafluoroethane.

19. A generator as in claim 13 wherein said throat diaphragm comprises a convex sound reflector so disposed that the converging sound wave is incident thereon.

20. A generator as in claim 13 wherein the diaphragm has a small bulk modulus of elasticity which is of the order of magnitude of 20,000 p.s.i.

21. A generator as in claim 13 wherein the diaphragm comprises a delay line having a thickness which is an integral number of half wave lengths.

22. A generator as in claim 13 wherein the alternating voltage means provides a sinusoidal voltage.

23. An asymmetrical sound wave generator according to claim 22 wherein said chamber is of a length affording transmission of the converging sound wave through the gas for a distance sufficient to produce high amplitude pressure pulses of mark-space ratio differing appreciably from unity, and means coupling said pressure pulses to the external fluid medium.

* * * * *